(12) United States Patent
Sharma et al.

(10) Patent No.: US 8,930,395 B2
(45) Date of Patent: Jan. 6, 2015

(54) PROACTIVE MONITORING OF DATABASE SERVERS

(75) Inventors: Anant Bondalapati Sharma, Hyderabad (IN); Deepak Ranjan Mishra, Hyderabad (IN); Surinder Kumar, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 314 days.

(21) Appl. No.: 13/347,134

(22) Filed: Jan. 10, 2012

(65) Prior Publication Data

US 2013/0179461 A1 Jul. 11, 2013

(51) Int. Cl.
*G06F 17/30* (2006.01)

(52) U.S. Cl.
USPC ............... 707/769; 707/705; 707/E17.014; 707/E17.005

(58) Field of Classification Search
USPC .......................................................... 707/769
See application file for complete search history.

(56) References Cited

U.S. PATENT DOCUMENTS

| | | | |
|---|---|---|---|
| 2002/0065879 A1* | 5/2002 | Ambrose et al. | 709/203 |
| 2007/0168228 A1* | 7/2007 | Lawless | 705/2 |
| 2008/0070495 A1* | 3/2008 | Stricklen et al. | 455/3.01 |
| 2009/0245236 A1* | 10/2009 | Scott et al. | 370/352 |
| 2011/0258083 A1* | 10/2011 | Ren | 705/27.1 |
| 2013/0073473 A1* | 3/2013 | Heath | 705/319 |

OTHER PUBLICATIONS

Free SQL Server Monitoring Tool, SpiceWorks, Inc., 2011, 1 pg.
SQL Server Monitoring Management Pack, Microsoft, Inc., 2011, pp. 1-5.
"Operational Monitoring, Diagnostics, Administration and Automated Tuning for SQL Server," Spotlight on SQL Server Enterprise, 2011, pp. 1-18, Quest Software, Inc.
"Application Performance Monitoring Made Simpler," Foglight, 2011, pp. 1-43, Quest Software, Inc.
"Application Performance Management," CA Technologies, 2011, pp. 1-7.

* cited by examiner

*Primary Examiner* — Shyue Jiunn Hwa
(74) *Attorney, Agent, or Firm* — Banner & Witcoff, Ltd.; Michael A. Springs

(57) ABSTRACT

A computer system monitors database servers to mitigate server availability risks. The plurality of servers may be proactively monitored to determine database status at each server before an alert is generated. An automated proactive process executes at a user's desktop to monitor database features over a plurality of database servers. Information about the server status is presented in a graphical user interface (GUI) format where status information for all of the database servers is presented in one integrated view in an automated manner. For example, the monitoring process reads a list of SQL instances and then connects to each listed SQL server to query the system catalogs of an SQL server engine. The monitoring process interprets the received information from the SQL servers and updates the GUI. The GUI may be color-coded to indicate the status state of individual SQL features for each monitored SQL server.

33 Claims, 11 Drawing Sheets

PROACTIVE MONITORING OF DATABASE SERVERS

FIELD

Aspects of the embodiments relate to a computer system that processes status information from database servers.

BACKGROUND

Companies, including financial businesses, manufacturing companies, and service-related businesses, often store and maintain databases in distributed or stand-alone form that are supported by numerous database servers. The database servers may be virtually or physically different and may reside at the same or different physical locations. The number of database servers may be very large, spanning tens, hundreds, or even thousands of physical and/or virtual computing machines. Consequently, a company may assign different database servers to different database administrators so that the each database server can be accessed and maintained in a reasonable manner. However, even with the partitioning of Database Server responsibilities, a database administrator often must expend an inordinate amount of time to adequately monitor assigned database servers on a daily basis.

With traditional systems, a database administrator is often dependent on status indications such as alerts, notification e-mail, and/or messages generated by monitoring agents executing at database servers. Based on the status indications, the database administrator may then investigate a particular database server for relevant status information by manually logging into an identified database server and performing health checks, one server at a time. The interface provided by a database server is typically not easy to use. In addition, configuring alerting agents on a newly built server often requires a sequence of steps to be performed on the server. Needless to say, the above-described process is very time consuming and cumbersome and does not provide the status information in a timely manner, further reducing the productivity of the database administrator. Moreover, the number of generated status indications is often quite large and many indications may be irrelevant to the proper operation of a database server. Consequently a database administrator may spend a substantial amount of time on a database server that does not need further investigation.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for monitoring a plurality of database servers to mitigate server availability risks. The plurality of servers may be proactively monitored to determine a database status at each server before an alert is generated and/or before server downtime starts.

According to one or more aspects, an automated proactive process that executes at a user's (DBA's) desktop, monitors features for a set of databases and servers that are distributed over a plurality of structured query language (SQL) servers. SQL server features may include: Log shipping, DB Mirroring, Replication, SQL Agent Jobs, Security baseline, SQL Server Patch level, Fixed disk free space, Database status and available space, Performance counters, and SQL error log. The automated process typically offers a substantial time savings with respect to traditional systems. According to traditional systems, a user, such as a database administrator, manually examines each of the SQL servers for health checks. It is often not practical to monitor each server over the course of the day with traditional systems. However, with an aspect of the disclosure, information about the SQL Server status is presented in a graphical user interface (GUI) format where status information for all of the listed SQL servers is presented in one integrated view in an automated manner.

According to one or more additional aspects, an automated monitoring process executes on a user's desktop, such as on a database administrators computer, without any custom executable files being installed on the Database Servers. The user may set the refresh time for updating the GUI and may initiate the monitoring of the SQL servers by the automated process. The monitoring process may read a list of SQL Server Instances from a designated Server detail repository (in form of a Database) of organization or from a flat text input file and then connects to each listed SQL server to query the System Catalogs of the SQL Server engine. Because the monitoring process runs from the user's desktop, configuration demand at the SQL servers side is circumvented. The monitoring process interprets the received information from the SQL servers and updates the GUI. By monitoring and obtaining additional information about SQL features for specified servers through the GUI, the database administrator or any other user may then report and fix detected issues.

According to one or more aspects, the GUI is color-coded to indicate the status of individual SQL features for each monitored SQL server. The process analyzes each SQL feature one by one, and based on the received status information color codes the feature as presented by the GUI. For example, a healthy status, a near threshold status, and a broken status may be color-coded as green, yellow, and red, respectively.

According to one or more aspects, the GUI virtually brings a set of database servers on a database administrator's desktop presenting a live and "at a glance" view. Frequent live view of database servers may assist the database administrator to become more familiar with a database server and its behavior. This approach may assist the database administrator to predict certain types of issues before the issues occur.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

In accordance with various aspects of the embodiments, a computer system processes status information from database servers supporting a database type, including a relational database, e.g., structured query language (SQL). The computer system monitors a plurality of database servers to mitigate server availability risks. Database administrators may span many relational database management systems (RDBMS) and may have common areas of interest that are monitored in a daily basis. A user display, e.g., a graphical user interface, may be tailored according to a selected RDBMS product. Moreover, the computer system may support different types of businesses that utilize a database server infrastructure, including financial, information technology (IT), and manufacturing companies.

Traditional Database monitoring systems often monitor database servers on behalf of a database administrator as a background process on each of the listed Database Servers. Issues regarding the database servers are reported though e-mail and/or short message service (SMS) resulting in significant dependency on the message infrastructure. However, according to various aspects of the embodiments, received status information about the SQL servers will be displayed with a graphical user interface (GUI) and coded by color to indicate the status of individual SQL Server\RDBMS features for each monitored SQL server. The process analyzes each SQL Server\RDBMS feature one by one, and based on the received status information color-codes the feature as presented by the GUI.

According to various aspects of the embodiments, control reports may be generated. to facilitate proactive monitoring by database administrators.

DBA Managers can also generate variety of Control report to ensure that the Proactive monitoring is happing in effective way.

Figure 1:
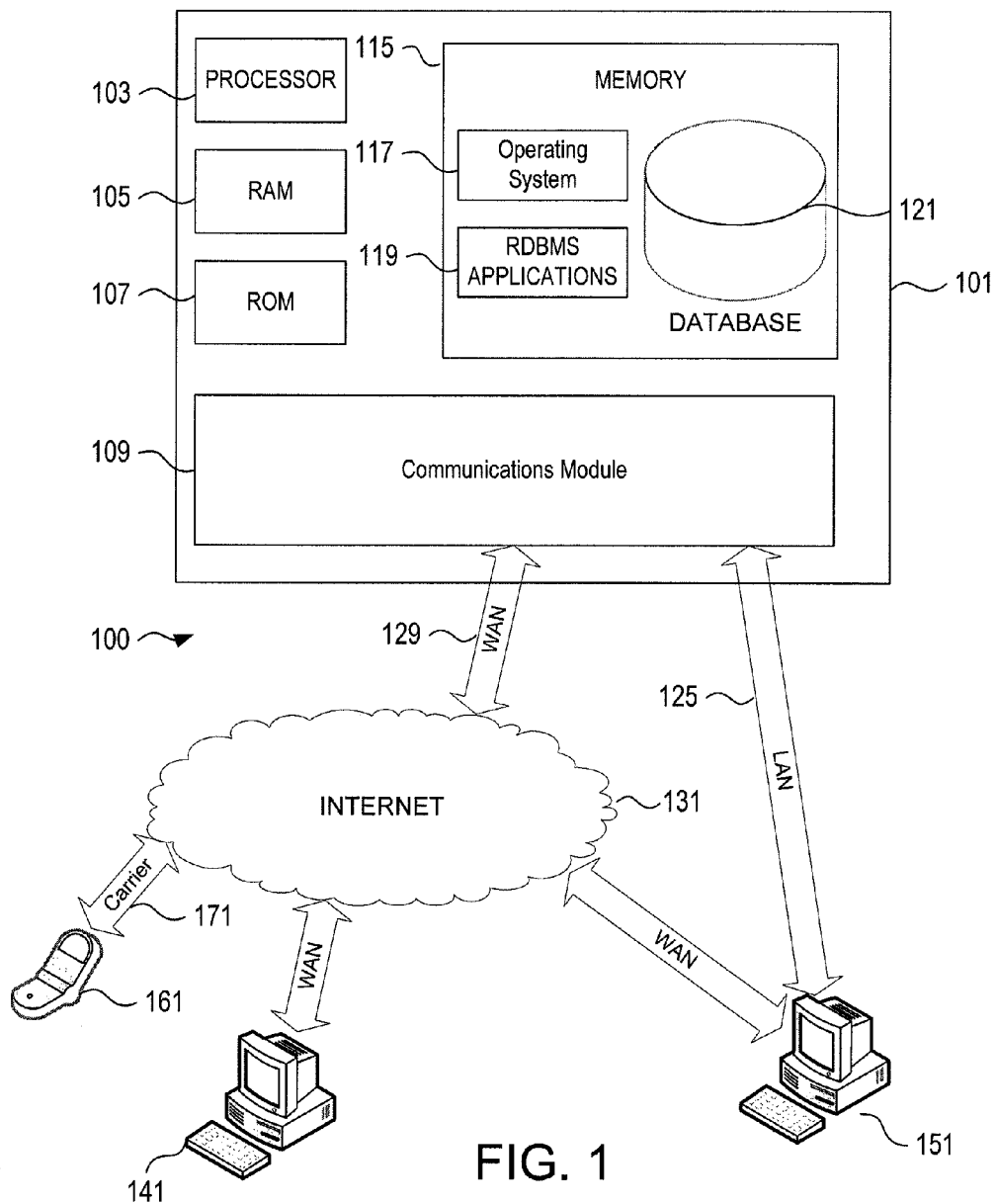
FIG. 1 illustrates an example of a suitable computing system environment that may be used according to one or more illustrative embodiments.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality contained in the disclosure. The computing system environment 100 should not be interpreted as having any dependency or requirement relating to any one or combination of components shown in the illustrative computing system environment 100.

The disclosure is operational with numerous other general purpose or special purpose computing system environments or configurations. Examples of well known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Also, some or all of the computer executable instructions for computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
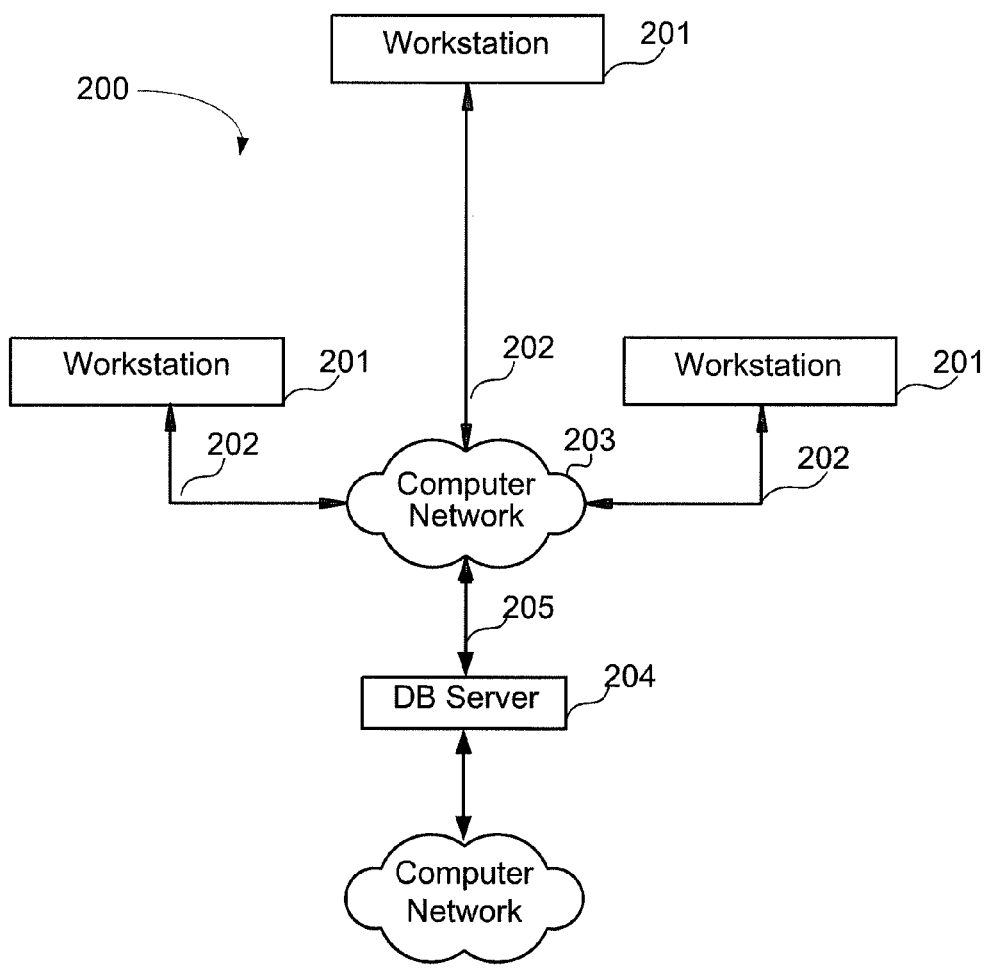
FIG. 2 shows an illustrative system for implementing example embodiments according to the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

The steps that follow in the Figures may be implemented by one or more of the components in FIGS. 1 and 2 and/or other components, including other computing devices.

Figure 3:
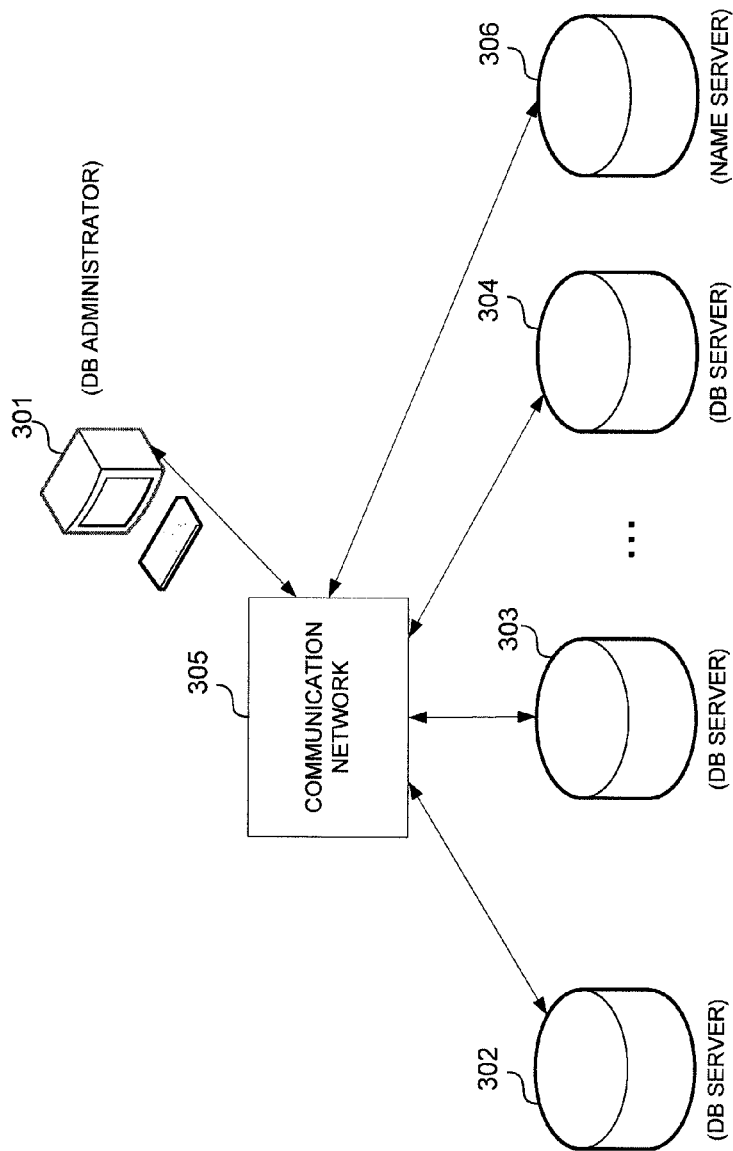
FIG. 3 shows a system with a plurality of database servers in accordance with an aspect of the disclosure.

FIG. 3 shows system 300 with a plurality of database servers 302, 303, and 304 in accordance with an aspect of the disclosure. Computer 301 (typically associated with a database administrator) interacts with database servers 302-304 through communication network 305.

As will be further discussed, processes (e.g., processes 400, 500, 600, 700, and/or 800 as shown in FIGS. 4-8, respectively) are executed on computer 301 (e.g., as shown as computer 101 in FIG. 1 or workstation 201 in FIG. 2) of the database administrator in order to proactively monitor assigned database servers 302-304. To facilitate monitoring, the assigned database servers are identified in server information stored at name server 306. Name server 306 may be integrated with computer 301 to ensure that a database administrator has access only to those database servers that the administrator is authorized.

Database servers 302-304 may serve different types of databases, including a relational database, e.g., SQL database. With one aspect, different RDBMS technologies may be supported under a multi-generation plan.

Figure 9:
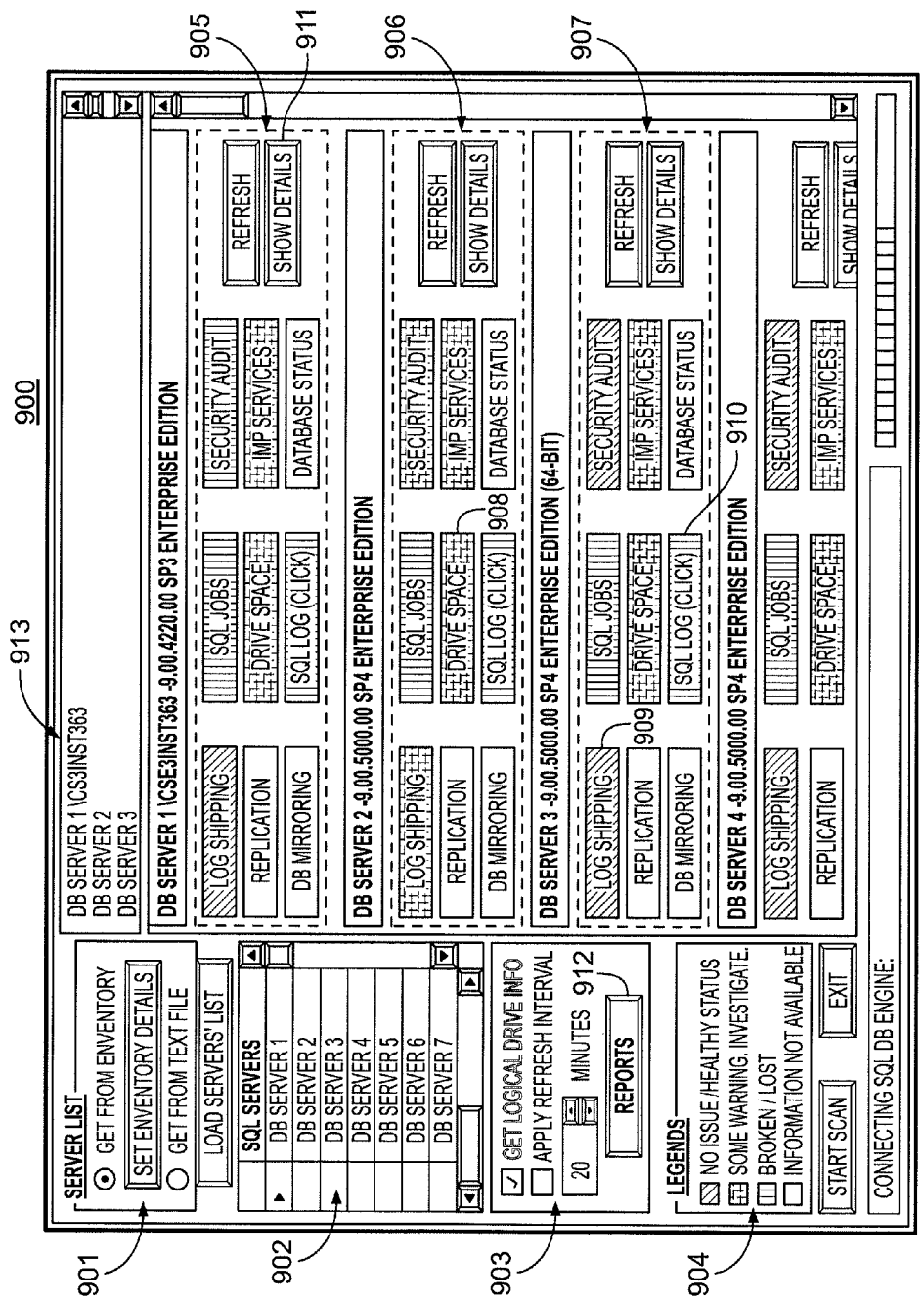
FIG. 9 shows a screenshot of a graphical user interface (GUI) for displaying database feature information in accordance with an aspect of the disclosure.

With some embodiments, the processes executing on computer 301 supports a graphical user interface that provides a near real-time view of multiple SQL server instances (e.g., screenshot 900 as shown in FIG. 9) on a database (DB) administrator's desktop. Because monitoring configuration is not required on a SQL server, the GUI tool may appear to be essentially instantaneous to the DB administrator so that any newly built SQL server can be viewed without having to prepare the server from monitoring stand point.

With some embodiments, the processes executing on computer 301 provide monitoring that is proactive rather than reactive because the monitoring is not predicated on status indications. Also, the processes may circumvent the need for configurations, agents, or components at database servers 302-304 and for an extra layer of intermediate messaging dependency (e.g., e-mail, alerts, messaging). Also, the processes may use a standard 32-bit operating system, thus circumventing a complicated monitoring infrastructure that demands an extra skill sets and significant cost with infrastructure dependency.

Figure 4:
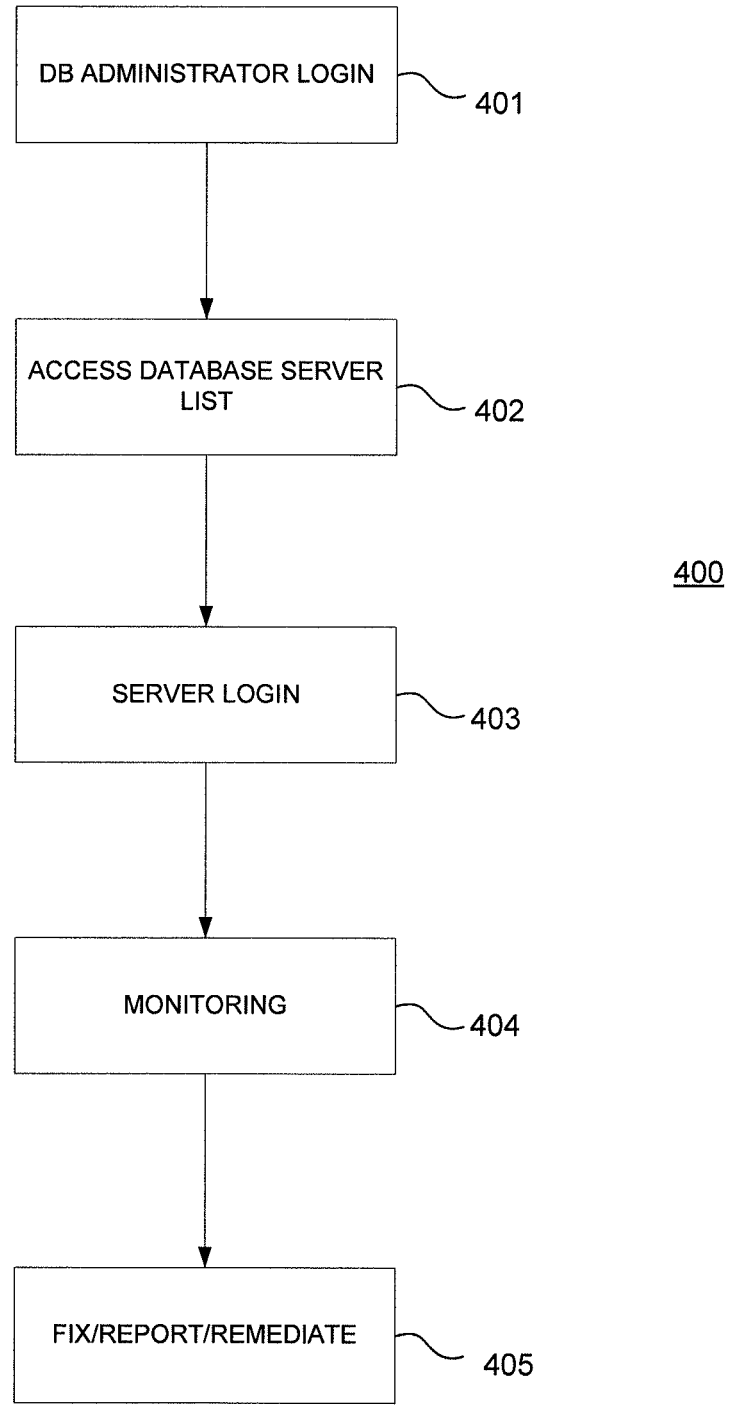
FIG. 4 shows a process for proactively monitoring database servers in accordance with an aspect of the disclosure.

FIG. 4 shows high-level process 400 for proactively monitoring database servers at computer 301 in accordance with an aspect of the disclosure. Process 400 may support different types of user interfaces, including a graphical user interface that will be further discussed with FIGS. 5-9.

With traditional Database Server monitoring systems, DB administrators manually log into database servers for health checks. For example, a DB administrator may spend approximately 10 minutes on an average on each database server when doing so. For example, with more than 30 to 50 SQL servers assigned, a DB administrator may allocate 5 to 8 hours to this task, thus severely degrading the DB administrator's productivity. Moreover, based on the practicality of the situation, it may be very unlikely that the DB administrator is able to monitor each database server every day.

At block 401, a database (DB) administrator logs into computer 301. At block 402, computer 301 uses the DB administrator's login identification to pull the database server list from name server 306 for servers assigned to the database administrator. As will be further discussed, name server 306 is identified through a suitable naming format, i.e., IP address, where the server name is contained in registry at computer 301. With some embodiments, the DB administrator will have status information for database servers that are assigned to that DB administrator, consequently providing better system security and isolation while reducing the work demands on the database administrator.

At block 403, computer 301 logs into a particular database server on behalf of the DB administrator at a desired time and establishes a connection to the database server. For example, the database administrator may configure a refresh interval so that assigned database servers are queried during each refresh interval to update the status information. The connection may be established from the desktop of computer 301 rather than an agent running on a database server.

At block 404, computer 301 receives status information from database servers 302-304, interprets the results and color codes database feature information that is displayed in GUI labels accordingly. Looking at the color (e.g., green, yellow, or red) imposed in the GUI labels, the DB administrator may obtain an expeditious view about the status of database servers 302-304. The DB administrator may then obtain detailed information about database servers features that appear to have a status issue.

With some embodiments, a DB administrator may obtain status information from a particular database server about SQL features for the assigned database servers. For example, exemplary SQL features may include the following.

LogShipping—High availability technique that keeps two copies of the database for DR readiness. The copy database should contain same data as its main production database.

DB Mirroring—Another high availability technique that keeps two copies of the database for disaster recovery (DR) readiness. The copy database should contain the same data as its main production database.

DB Replication—Maintaining multiple copies of same data across multiple sites (distribute across sites). It also provides high availability for DR readiness. A set of complicated components should be monitored to ensure that all the sites have right and latest data.

Failover Cluster—Redundant servers form a group and appear as if a single server to applications. Failure of one machine invokes other machine in group to take over the application request that is transparent to client.

Memory Pressure—Examines server memory utilization and detects possible memory pressure server may run under.

CPU Pressure—Examines server processor utilization and detects possible CPU bottleneck.

IO—Examines servers disk subsystem read/write operations to detect possible IO bottleneck.

Database Status—Examines available free space within database files, readiness to accept transaction, and/or DB configuration per organization standards (file location, mode).

Free Disk Space—Examines that all the drives on server has >20% free space at least.

SQL Related Services—Examines that all the required and important SQL related services are running on the SQL server.

Database Statistics—Examines outdated Statistics to ensure optimum query performance.

Patch Level—Latest recommended patch level must be ensured to keep the servers up to date, optimum, secure and compliant within organization.

User Access Level—Adherence to organization's security guidelines. Proactive detection saves a lot of audit failure while maintains a compliant and secured database servers.

Database users without any database roles assigned within database.

Memory configuration—according to recommendations for 32-bit and 64-bit systems.

SQL Services Service accounts (for a domain account)

Database file Autogrowth related settings.

SQL Server scheduled Jobs status (success, failure or hung)—checks if a job missed its defined schedule.

SQL Server Error Log—reported errors that may cause business outage in due course of time if couldn't be noticed.

Database Backups sent to Tapes

Database Backup is NOT too old.

Detection of a recent Server Reboot and a SQL Recycle—Fatal error may cause automatic frequent reboots.

At block 405, the DB administrator uses the status and detailed information provided by monitoring block 404 to remediate and/or report the SQL issue for the corresponding SQL server.

Figure 5:
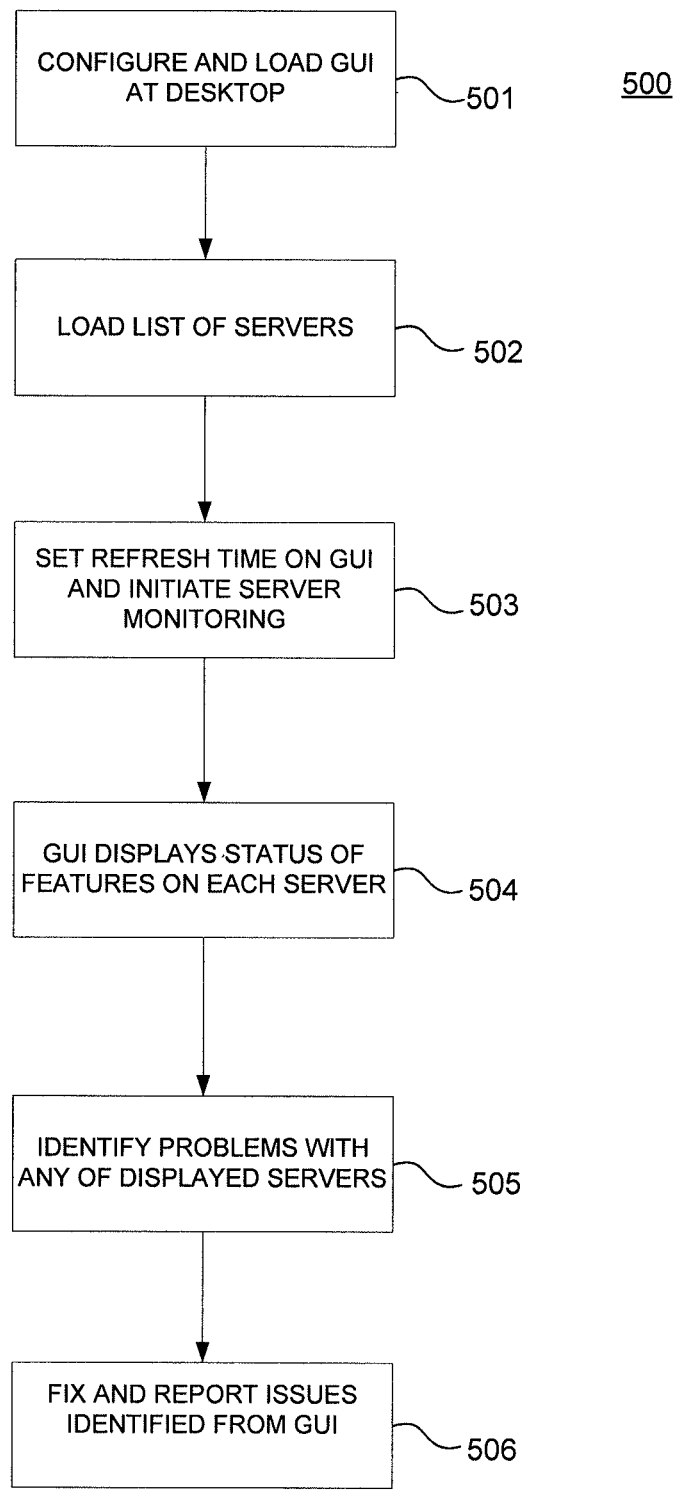
FIG. 5 shows a process for proactively monitoring database servers through a graphical user interface (GUI) in accordance with an aspect of the disclosure.

FIG. 5 shows process 500 for proactively monitoring database servers through a graphical user interface in accordance with an aspect of the disclosure. (An example of the graphical user interface is shown in FIG. 9 showing the status of the assigned database servers.) Process 500 integrates the assigned database servers onto the DB administrator's desktop through the graphical user interface. Consequently, the DB administrator may have a near real-time view of the administrator's database servers at a glance on the desktop. By viewing the health of the assigned DB servers in one integrated view, the DB administrator can work more efficiently while all of the assigned database servers multiple times during the day. In addition, by viewing the near real-time status, the DB administrator becomes more familiar with the operating characteristics of the assigned database servers.

At block 501, the graphical user interface is configured and loaded onto the desktop of the DB administrator. For example, the DB administrator may select and order some or all of the SQL features as discussed above based on the needs of the administrator.

At block 502, similar to block 402, process 500 pulls the database server list from name server 306 for servers assigned to the database administrator.

At block 503, process 500 establishes the refresh time interval for updating the status information on the graphical user interface. For example, referring to FIG. 9, the DB administrator may set the refresh time by entering the desired time (e.g., 20 minutes) at region 903. With some embodiments, setting the refresh time may be optional for the database administrator. For example, the refresh time may be set to a default value.

At block 504, the graphical user interface displays the status for the database features for each of the assigned database servers. For example, referring to FIG. 9, labels for SQL features Log Shipping, SQL Jobs, Security Audit, Replication, Drive Space, Imp Services, DB Mirroring, SQL Log, and Database Status are color coded to convey the status of the corresponding database feature for the each of the assigned database servers. With some embodiments, computer 301 establishes a connection to a database server, obtains status information about the database features, and closes the connection after completing each features scan on the Database Server. The database administrator may further obtain a detailed view of the database features for a database server.

Figure 10:
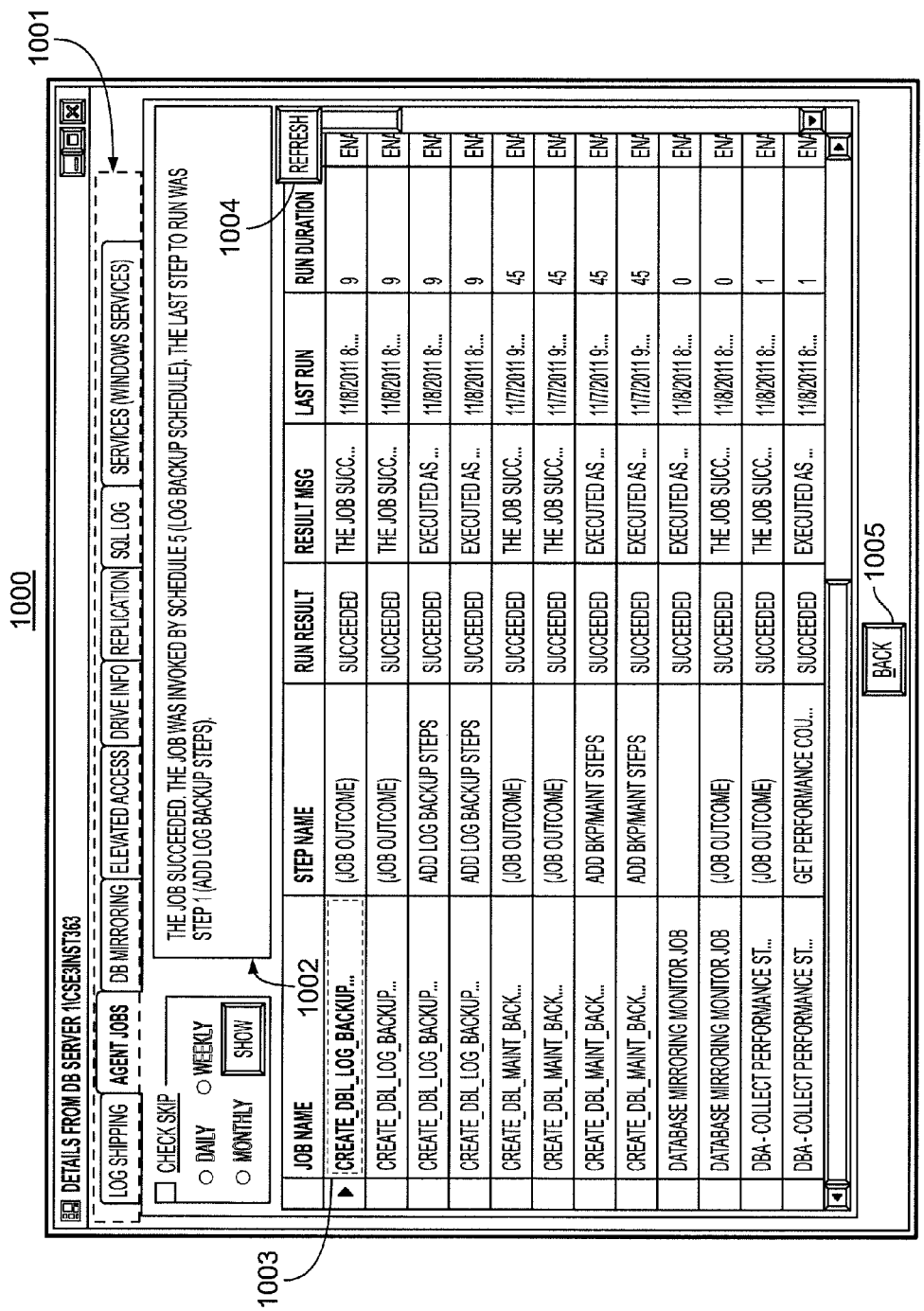
FIG. 10 shows a screenshot of detailed information for a Database Server feature in accordance with an aspect of the disclosure.

Based on the indicated health of the database features, the DB administrator may identify problems with any of the assigned database servers. For example, referring to FIG. 9, feature labels shown in red may be indicative of the need for further investigation. In such a case, the DB administrator may obtain detailed information (e.g., as shown in FIG. 10) and generate reports at block 506. After identifying the issue and conducting a root cause analysis, the DB administrator may use a preferable way to further fix the issue.

With some embodiments, multiple instances of the GUI may be executed in parallel on same desktop with smaller sets of Database Server List for a quicker scan with a large number of DB servers. Also, the frequency for auto refresh should be set based on the maximum time taken to scan a particular set of DB servers.

With some embodiments, the DB administrator may interact with the GUI (i.e., trying to scroll the view) while it is in middle of scanning a list of servers. The GUI may pause the scanning while DB administrator holds the mouse pressed. The moment DB administrator releases, the GUI resumes.

Figure 6:
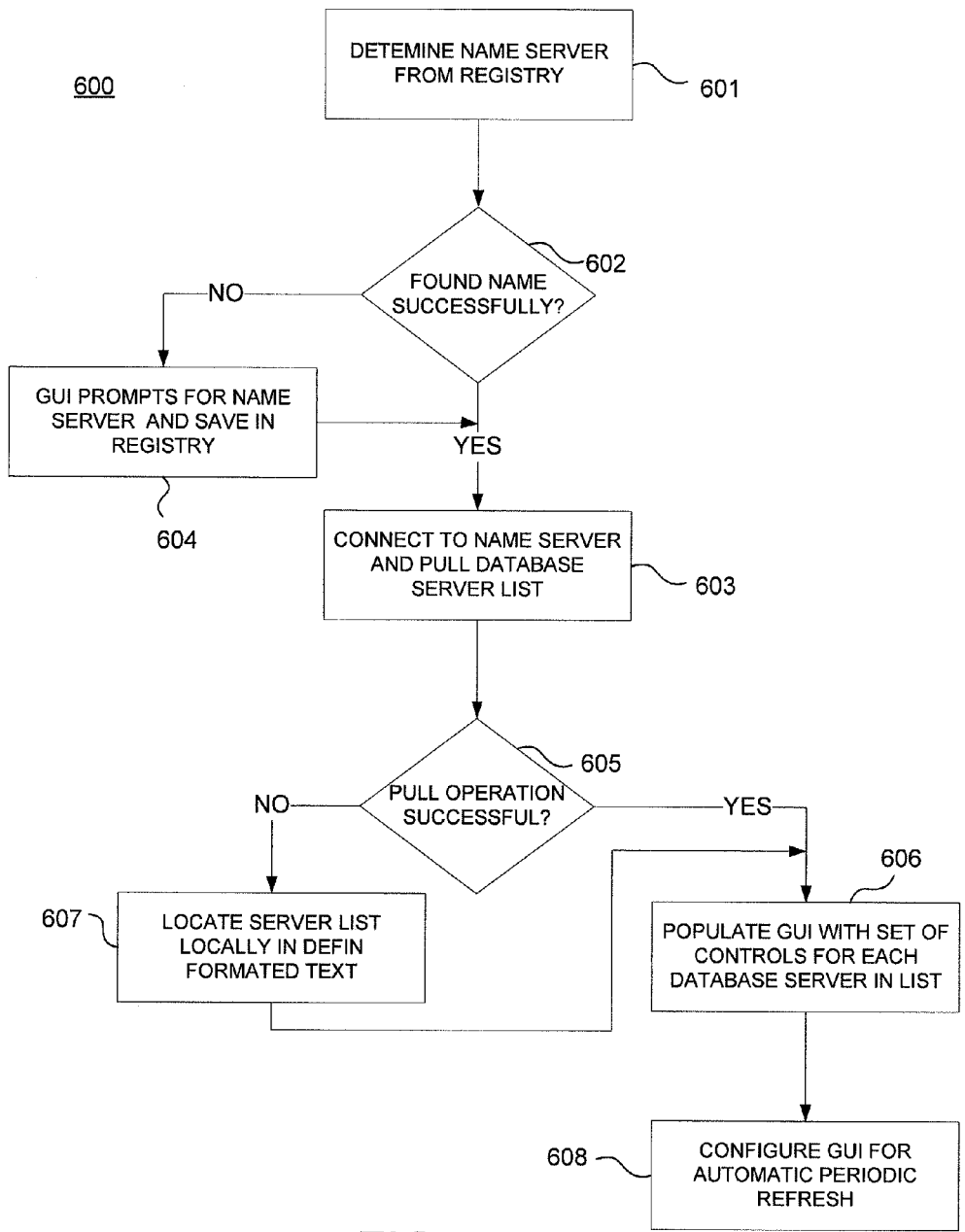
FIG. 6 shows a process for obtaining a list of database servers associated with a Database Administrator (DBA) in accordance with an aspect of the disclosure.

FIG. 6 shows process 600 for obtaining a list of database servers corresponding to blocks 402 and 502 as shown in FIGS. 4 and 5, respectively.

At block 601, computer 301 determines the identification of name server 306 from a registry typically located at computer 301. Name server 306 is typically where an organization maintains a mapping of assigned DB servers to database administrators. If computer 301 successfully finds the identification (e.g., URL of the name server) at block 602, computer 301 connects to name server 306. If not, computer 301 prompts the user to identify the "Name Server" at block 604.

At block 603, computer 301 pulls the list of database servers assigned to the DB administrator. Having the list stored at a company's centralized repository, e.g., name server 306, may facilitate maintaining assignment of database servers for a plurality of DB administrators. Consequently, server responsibilities can be easily changed among the DB administrators and new DB servers can be added. With some embodiments, the list only includes only database servers that the DB administrator is authorized to access for security reasons. If the pull operation is successful at block 605, the graphical user interface is populated with a display region (e.g., regions 905-907 as shown in FIG. 9) for each database server in the list at block 606. The graphical user interface can be then configured for automatic period refresh at block 608 based on the desired refresh interval. As required, the DB administrator may initiate one time monitoring. With some embodiments, a database administrator may choose not to set automatic refreshing but may choose to initiate a scan as and when required.

If the pull operation is not successful, computer 301 may be able to locate the server list in a text file stored locally on computer 301 at block 607. With some embodiments, the database administrator has an option to locate the text file to obtain the database server names.

Figure 7:
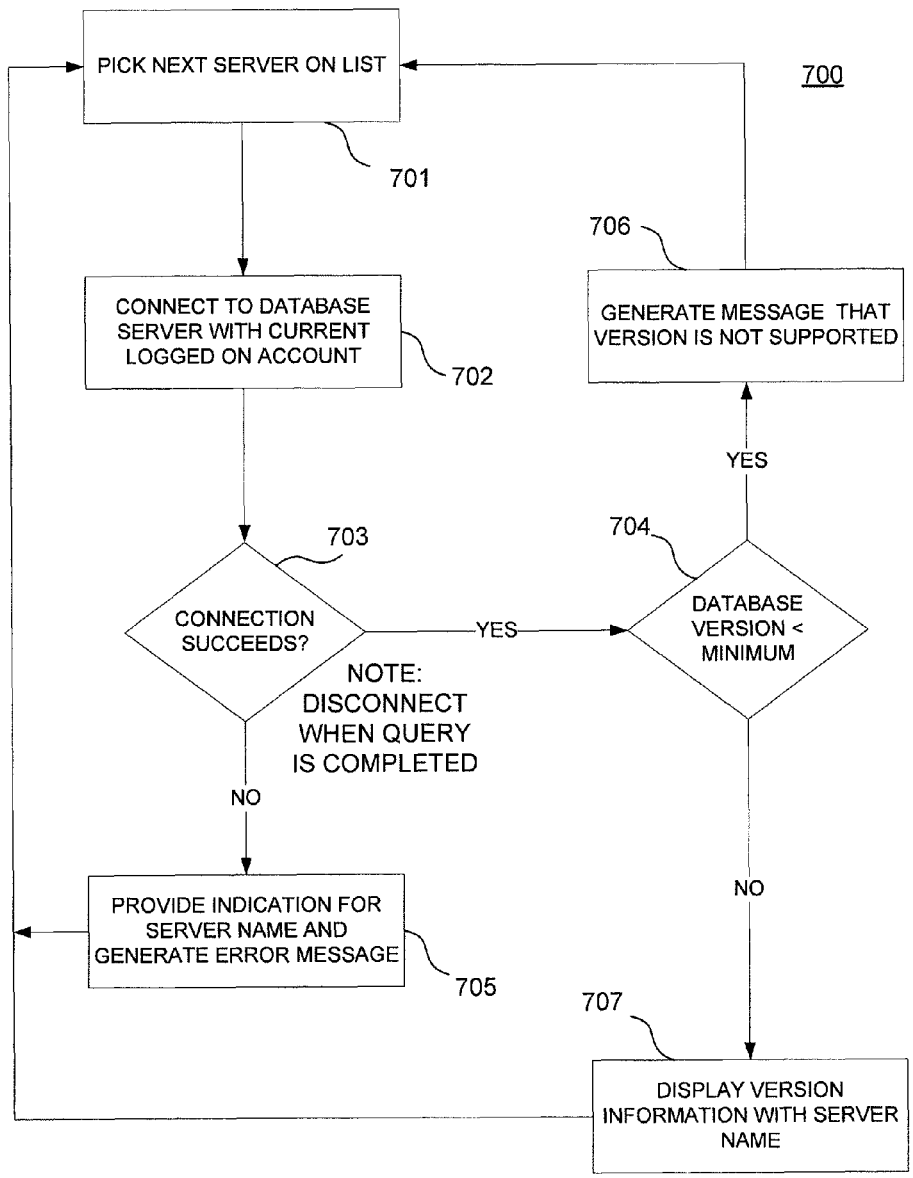
FIG. 7 shows a process for connecting to a database server in accordance with an aspect of the disclosure.

FIG. 7 shows process 700 for connecting to a database server in accordance with an aspect of the disclosure. At block 701, computer 301 determines the next database server on the list (as obtained by process 600) and connects to the database server on behalf of the DB administrator at block 702. If the connection is successful at block 703, computer 301 checks the database version of the database server at block 704. If the version is less than a minimum level, a message may be displayed on the graphical user interface indicating so at block 706. Otherwise, the version may be displayed on the graphical user interface at block 707. Displayed information may include a patch level, edition, and/or indication whether the version is for 32 or 64 bit configurations. If the connection is not successful, an error message may be generated on the graphical user interface at block 705.

After completion of block 705 process 700 is repeated for the next database server on the list. On reaching to block 707, process 800 is performed before repeating process 700 for traversing the Server list until the end of the list is reached.

Figure 8:
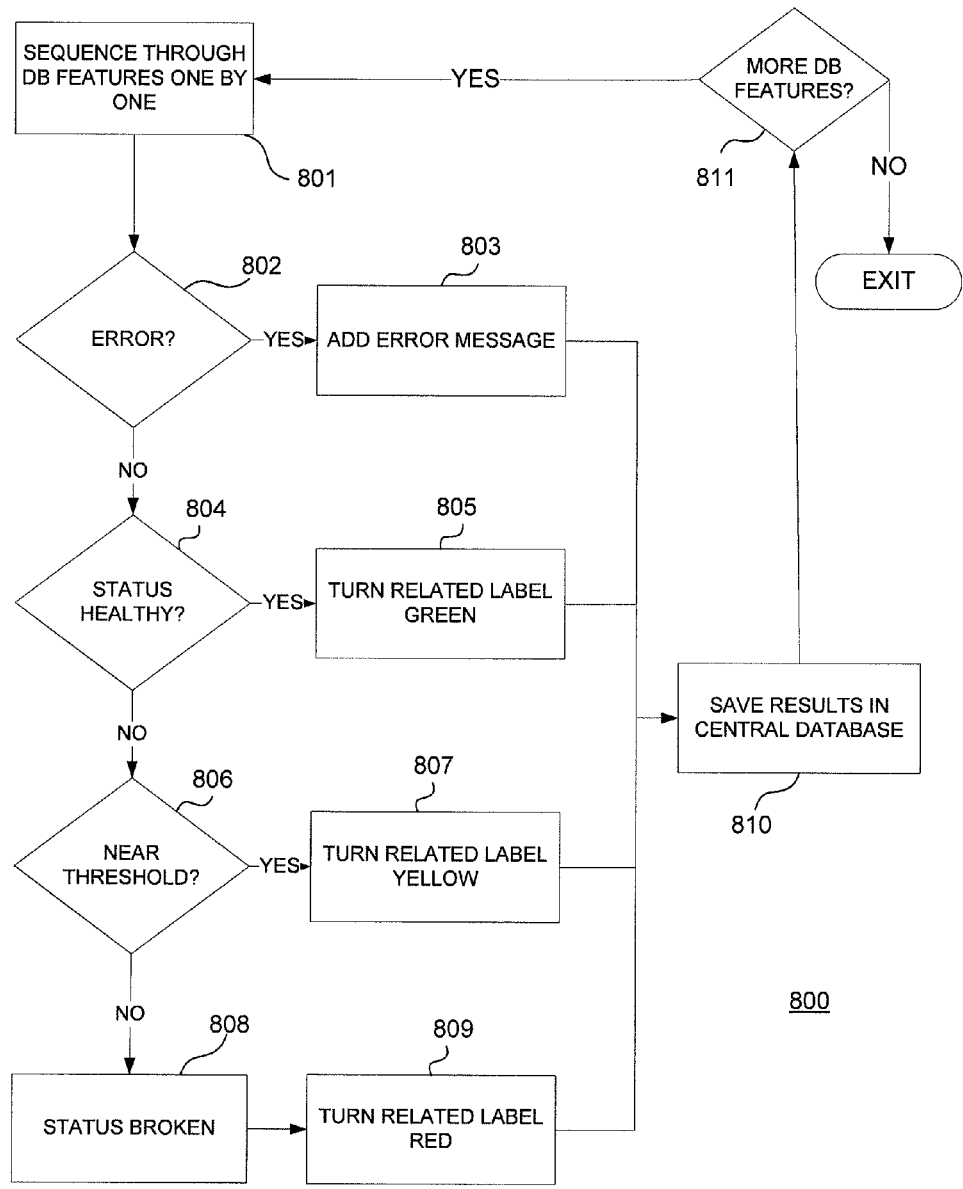
FIG. 8 shows a process for obtaining Database Server feature information from a database server in accordance with an aspect of the disclosure.

FIG. 8 shows process 800 for obtaining database feature information from a database server in accordance with an aspect of the disclosure. Process 800 may be repeated for each refresh interval by computer 301 connecting to a database server and obtaining status information from the database server. When the information has been received, computer 301 terminates the connection and repeats the process for the next database server on the list.

When the connection has been established to a database server, status information for each database feature is obtained from the database server at block 801. For example, computer 301 may query the database server for a system catalog of a SQL server engine. The system catalog is a repository of the server's internal information that the server uses for its own operations. For example, the system catalog may comprise a set of multiple objects in which different objects contain information related to different features.

Based on the health of a feature as determined by an analysis of the received status information, computer 301 color codes feature label in the graphical user interface for the feature at blocks 802-809. For example, referring to FIG. 9, Log Shipping, Drive Space, and Security Audit for server CRPCONMSQYY are color coded green, yellow, and red to indicate status states of healthy, warning, and broken, respectively. With some embodiments, if a feature is not found as configured, the corresponding label turns to gray as "disabled" for the associated DB Server. At block 803, when an error is detected, there is no change to the color of the related label. According to another aspect of the embodiments, the received status information from the DB servers may be compared to status criteria, where the criteria and threshold values may be configurable.

Status information for the feature is saved in a memory at block 810. If there are more database features to review, as determined at block 811, blocks 801-810 can be repeated. When all of the database features has been processed, process 800 can be repeated for the next database server in the server list.

Referring to FIG. 9, a DB administrator can specify the source of the server list at region 901. As previously discussed, the server list is typically obtained from a centralized repository (designated Enventory in screenshot 900) or may be obtained from a text file that is locally located at computer 301. The list of database servers is then displayed in region 902. Status information for the database features is displayed for each of the database servers in a corresponding region (e.g., 905-907). As previously discussed, feature labels may be color coded (as per the legend in region 904) to indicate the status state of the corresponding feature. For example, label 908 is shown in yellow to indicate that one of the disk drives has less than 20% of free space. Label 909 is shown in green because no issues have been detected for this server for Logshipping. Label 910 is shown in red because at least one critical error has been reported in the SQL Server error log in last 24 hours. As will be discussed, screenshots 1000 and 1100 may be displayed by computer 301 when the DB administrator selects items 911 and 912, respectively. Region 913 displays a collection of operation errors and/or exceptions encountered by the monitoring GUI while examining the SQL Servers in the list shown in region 902.

FIG. 10 shows screenshot 1000 of detailed information for the database feature agent jobs for a selected database server CRPCONMSQYY\CSE3INST36. Detailed information about different features may be selected from the Tab Pages shown in region 1001. Region 1002 displays the detailed output for Job Step 1003. Region 1002 dynamically changes the text color based on the failure or success of the selected Job Step. The DB administrator may refresh the current view with the latest status information by selecting item 1004. Selection of region 1005 closes the detailed view and takes the DBA to the main "at a glance" screen.

Figure 11:
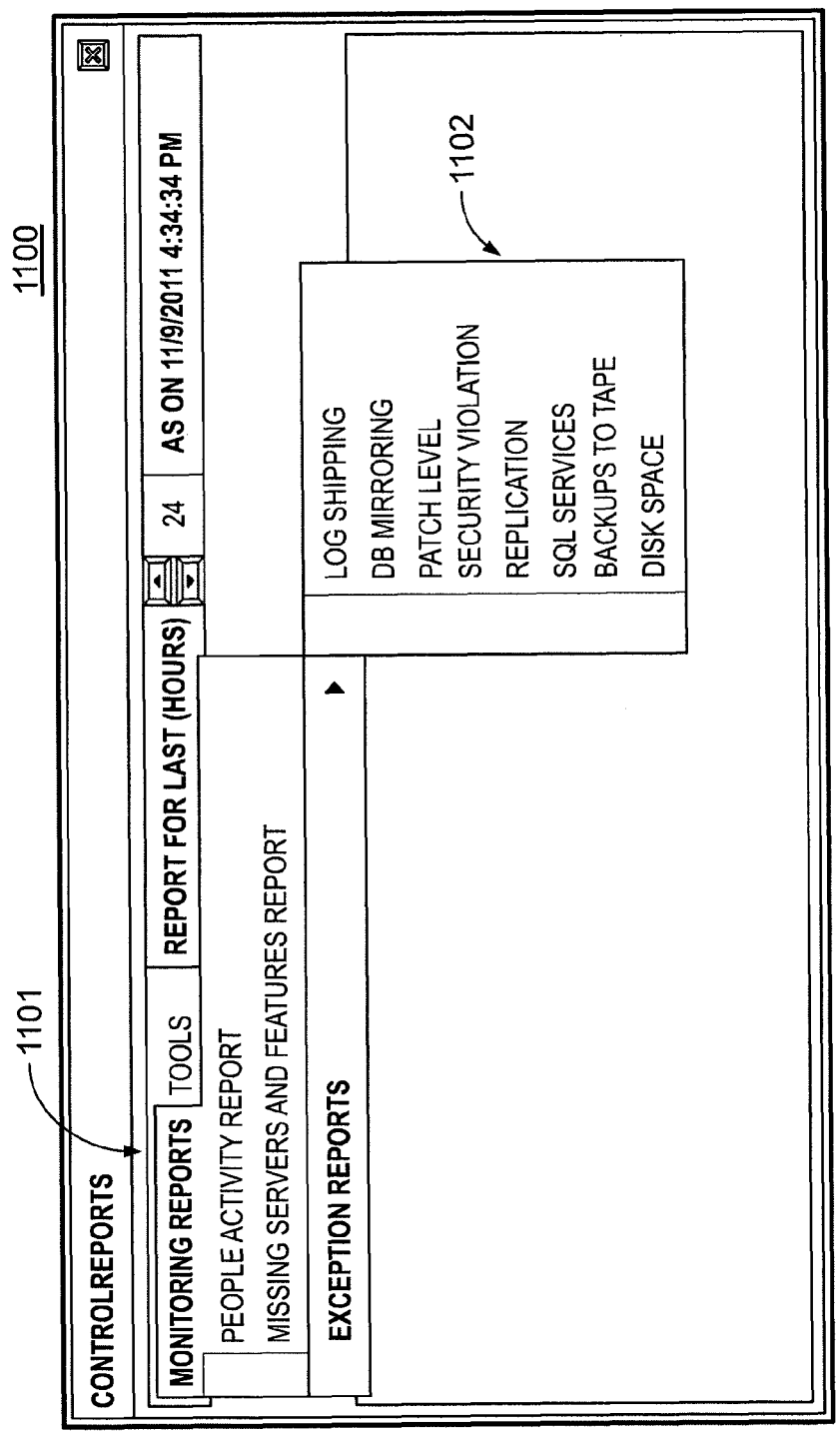
FIG. 11 shows a screenshot of report information in accordance with an aspect of the disclosure.

FIG. 11 shows screenshot 1100 of report information in accordance with an aspect of the disclosure. Screenshot 1100 may be initiated through screen shot 900 at item 912.

Monitoring reports may be selected through region 1101. For example, a list of the DB administrators with the last activity date and time or a list of features and servers that could not be monitored may be displayed. Also, exception reports may be displayed for a selected feature at region 1102. An exemption report typically contains information similar to what is presented in the detailed view of screenshot 1000. A custom report may be designed and included based on reporting requirements.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

We claim:

1. An apparatus comprising:
at least one memory; and
at least one processor coupled to the at least one memory and configured to perform, based on instructions stored in the at least one memory:
obtaining a first server list of a first plurality of database servers and a second server list of a second plurality of database servers that are assigned to a first administrator and a second administrator, respectively, wherein the first and second server lists have at least one different database server entry;
configuring a first display for displaying database feature information for each database server of the first plurality of database servers, wherein the first display is assigned to the first administrator;
automatically obtaining the database feature information from the first database server on the first server list through an administrative database feature, wherein the database feature information is indicative of a status attribute for administering the first database server;
incorporating the database feature information into the first display for the first database server;
repeating the automatically obtaining and the incorporating for a second database server in the first server list;
configuring a second display assigned to the second administrator;
providing status data to the second display for the second plurality of database servers on the second server list;
obtaining a performance metric value from the first database server; and
determining the status attribute from the performance metric value.

2. The apparatus of claim 1, wherein the first database server comprises a structured query language (SQL) server.

3. The apparatus of claim 2, wherein the at least one processor is further configured to perform:
querying a system catalog of a SQL server engine for the database feature information.

4. The apparatus of claim 1, wherein the automatically obtaining comprises:
obtaining first feature information for a first administrative database feature through the first database server, wherein the first feature information is indicative of a first status attribute for administrating the first database server; and
in response to receiving the first feature information, obtaining second feature information through a second administrative database feature from the first database server, wherein the second feature information is indicative of a second status attribute for administrating the first database server.

5. The apparatus of claim 1, wherein the at least one processor is further configured to perform:
automatically obtaining updated database feature information for the first database server during a subsequent time interval, wherein the updated database feature information is indicative of an updated value of the status attribute; and
updating the first display with the updated database feature information.

6. The apparatus of claim 1, wherein the first display displays a graphical user interface (GUI).

7. The apparatus of claim 6, wherein the at least one processor is further configured to perform:
coding a status indicator with a selected color for a first administrative database feature on the first database server, wherein the selected color is indicative of a status state.

8. The apparatus of claim 7, wherein the at least one processor is further configured to perform:
repeating the color coding for another administrative database feature on the first database server.

9. The apparatus of claim 8, wherein the at least one processor is further configured to perform:
repeating the color coding for the second database server.

10. The apparatus of claim 7, wherein the at least one processor is further configured to perform:
obtaining at least one status criterion for the first administrative database feature;
determining the status state for the first administrative database feature from the at least one status criterion and the database feature information; and
based on the determined status state, displaying a label on the first display for the first administrative database feature with the selected color.

11. The apparatus of claim 1, wherein the obtaining the server list comprises:
attempting to obtain the list from a name server; and
when the attempt is unsuccessful, locating the server list in a text file.

12. The apparatus of claim 1, wherein the at least one processor is further configured to perform:
receiving an indicator for one of a plurality of administrative database features; and
presenting detailed information about the status attribute of said one of the plurality of administrative database features.

13. The apparatus of claim 1, wherein the at least one processor is further configured to perform:
receiving a selection for a subset of administrative database features from a plurality of administrative database features; and
presenting database feature information only for the subset of administrative database features.

14. The apparatus of claim 13, wherein the at least one processor is further configured to perform:
ordering the subset of administrative database features on the first display based on input information.

15. The apparatus of claim 1, wherein the at least one processor is further configured to perform:
determining a feature list to be monitored based on a type of relational database management system (RDBMS) being monitored.

16. The apparatus of claim 1, wherein the at least one processor is further configured to perform:
automatically opening a connection to a first database server from the first plurality of database servers; and
automatically closing the connection to the first database server after completing the obtaining.

17. The apparatus of claim 1, wherein the at least one processor is further configured to perform:
comparing the database feature information with a configurable threshold; and
coding the database feature information for the first database server based on the comparing.

18. The apparatus of claim 1, wherein the at least one processor is further configured to perform:
deleting a first entry for the first database server on the first server list; and
adding a second entry for the first database server on the second server list, wherein the first database server is re-assigned to the second administrator from the first administrator.

19. A computer-assisted method for processing data, the method comprising:
obtaining a first server list of a first plurality of relational database servers and a second server list of a second plurality of relational database servers that are assigned to a first administrator and a second administrator, respectively, wherein the first and second server lists have at least one different database server entry;
configuring a graphical user interface (GUI) for displaying database feature information for each relational database server of the first plurality of database servers;
automatically obtaining the database feature information from a first relational database server through an administrative database feature, wherein the database feature information is indicative of a status attribute for administrating the first relational database server;
incorporating the database feature information into the graphical user interface for the first relational database server, wherein the graphical user interface is associated with the first administrator;
repeating the automatically obtaining and the incorporating for a second relational database server from the first server list;
deleting a first entry for the first database server on the first server list;
adding a second entry for the first database server on the second server list, wherein the first database server is re-assigned to the second administrator from the first administrator;
incorporating, at a display device, the database feature information for the first relational database feature, wherein the display device is associated with the second administrator;
obtaining a performance metric value from the first relational database server; and
determining the status attribute from the performance metric value.

20. The method of claim 19, wherein the first relational database server supports a structured query language (SQL) database.

21. The method of claim 20 further comprising:
querying a system catalog of a SQL server.

22. The method of claim 20, wherein the automatically obtaining comprises:
obtaining first feature information through a first SQL feature from a first SQL database server, wherein the first feature information is indicative of a first status attribute for administrating the first SQL database server; and
in response to receiving the first feature information, obtaining second feature information through a second SQL feature from the first SQL database server, wherein the second feature information is indicative of a second status attribute for administrating the first SQL database server.

23. The method of claim 20 further comprising:
automatically obtaining updated database feature information for the first SQL database server during a refresh time interval, wherein the updated database feature information is indicative of an updated value of the status attribute; and updating the GUI with the updated database feature information.

24. The method of claim 20, further comprising:
color coding a status indicator of the GUI for a first administrative database feature for the first SQL database server.

25. The method of claim 19, further comprising:
receiving an indicator for one of a plurality of administrative database features; and
presenting detailed information about said one of the plurality of administrative database features.

26. The method of claim 19 further comprising:
receiving a selection for a subset of database features from a plurality of administrative database features; and
presenting database feature information on the GUI only for the subset of administrative database features.

27. The method of claim 26 further comprising:
ordering the subset of administrative database features on the GUI based on user input information.

28. The method of claim 19, wherein an instance of the GUI interacts only with one type of relational database management system (RDBMS).

29. A non-transitory computer-readable storage medium storing computer-executable instructions that, when executed, cause a processor at least to perform operations comprising:
obtaining a first server list of a first plurality of structured query language (SQL) database servers and a second server list of a second plurality of SQL database servers that are assigned to a first administrator and a second administrator, respectively, wherein the first and second server lists have at least one different database server entry;
configuring a graphical user interface (GUI) for displaying database feature information for each SQL database server of the first plurality of SQL database servers, wherein the graphical user interface is assigned to the first administrator;
querying at least one system catalog of a SQL server engine for the database information;
based on the querying, obtaining the database feature information from a first SQL database server through an administrative database feature, wherein the database feature information is indicative of a status attribute for administrating the first SQL database server;
comparing the database feature information with a configurable threshold;
coding the database feature information for the first SQL database server based on the comparing;
including the coded database feature information for the first database server into displayed information of the graphical user interface;
repeating the obtaining and the incorporating for a second SQL database server from the first server list; and
providing, on a display device of the second administrator, status data for the second plurality the SQL database servers on the second server list;
obtaining a performance metric value from the first SQL database server; and
determining the status attribute from the performance metric value.

30. The non-transitory computer-readable storage medium of claim 29, wherein the computer-executable instructions, when executed, cause the processor to perform:
obtaining first feature information through a first SQL feature from the first SQL database server, wherein the first feature information is indicative of a first status attribute for administrating the first SQL database server; and
in response to receiving the first feature information, obtaining second feature information through a second SQL feature from the first SQL database server, wherein the second feature information is indicative of a second status attribute for administrating the first SQL database server.

31. The non-transitory computer-readable storage medium of claim 29, wherein the computer-executable instructions, when executed, cause the processor to perform:
color coding a status indicator of the GUI for a first administrative database feature for the first SQL database server.

32. The non-transitory computer-readable storage medium of claim 29, wherein the computer-executable instructions, when executed, cause the processor to perform:
repeating the color coding for a plurality of SQL database features and the plurality of SQL database servers.

33. An apparatus comprising:
at least one memory; and
at least one processor coupled to the at least one memory and configured to perform, based on instructions stored in the at least one memory:
partitioning a plurality of assigned database servers to a first administrator and a second administrator, the plurality of assigned database servers comprising a first group of database servers and a second group of database servers, wherein the first and second groups are non-overlapping;
obtaining a first server list for the first group of database servers and a second server list for the second group of database servers;
configuring a display of the first administrator for displaying database feature information for each server of the first group of database servers;
automatically obtaining the database feature information from a first database server of the first server list the through an administrative database feature, wherein the database feature information is indicative of a status attribute for administering the first database server;
incorporating the database feature information into the display for the first database server;
preventing access to the database feature information to the second administrator;
repeating the automatically obtaining, the incorporating, and the preventing for a second database server in the first server list;
preventing the first administrator from accessing status data for all database servers on the second server list;
obtaining a performance metric value from the first database server; and
determining the status attribute from the performance metric value.

* * * * *